(12) United States Patent
Wilcox et al.

(10) Patent No.: US 7,296,377 B2
(45) Date of Patent: Nov. 20, 2007

(54) COMBINED OUTRIGGER HOLDER AND FISHING ROD HOLDER

(76) Inventors: Roger Wilcox, 609 5th Key Dr., Ft. Lauderdale, FL (US) 33303; Scott A. Wilcox, 9721 N. New River Canal R.D.# 312, Plantation, FL (US) 33324

( * ) Notice: Subject to any disclaimer, the term of this patent is extended or adjusted under 35 U.S.C. 154(b) by 0 days.

(21) Appl. No.: 11/605,973

(22) Filed: Nov. 29, 2006

(65) Prior Publication Data

US 2007/0074446 A1   Apr. 5, 2007

(51) Int. Cl.
*A01K 97/10* (2006.01)
(52) U.S. Cl. .................. 43/21.2; 43/27.4; 114/255; 248/514; 248/515; 248/534; 248/541
(58) Field of Classification Search ............... 43/21.2, 43/27.4; 114/255, 365; 248/514–516, 534, 248/535, 538, 540, 541
See application file for complete search history.

(56) References Cited

U.S. PATENT DOCUMENTS

| 159,795 | A | * | 2/1875 | Clarke | 248/514 |
|---|---|---|---|---|---|
| 235,828 | A | * | 12/1880 | Thatcher | 248/515 |
| 276,791 | A | * | 5/1883 | Engle, Jr. | 248/515 |
| 314,290 | A | * | 3/1885 | Haitz | 248/515 |
| 1,013,734 | A | * | 1/1912 | Boyd | 43/21.2 |
| 1,877,845 | A | * | 9/1932 | Gerline | 248/514 |
| 1,985,985 | A | * | 1/1935 | Gerline | 43/21.2 |
| 2,430,112 | A | * | 11/1947 | Hamre | 43/21.2 |
| 2,506,824 | A | * | 5/1950 | Brown et al. | 248/515 |
| 2,580,130 | A | * | 12/1951 | Rowdon | 43/21.2 |
| 2,693,660 | A | * | 11/1954 | Nebergall et al. | 43/21.2 |
| 3,006,588 | A | * | 10/1961 | Lemi | 248/515 |
| 3,008,259 | A | * | 11/1961 | Zornes | 248/515 |
| 3,010,687 | A | * | 11/1961 | Hagberg | 248/515 |
| 3,063,668 | A | * | 11/1962 | Yohe | 43/21.2 |
| 3,246,865 | A | * | 4/1966 | Latimer | 43/21.2 |
| 3,304,037 | A | * | 2/1967 | Candela | 248/515 |
| 3,516,190 | A | * | 6/1970 | Cook | 43/21.2 |
| 3,595,504 | A | * | 7/1971 | Anderson et al. | 248/515 |
| 3,719,331 | A | * | 3/1973 | Harsch | 43/43.12 |
| 3,724,791 | A | * | 4/1973 | Mason | 248/515 |
| 3,783,547 | A | * | 1/1974 | Bystrom et al. | 43/21.2 |
| 3,785,079 | A | * | 1/1974 | Rohn | 43/43.12 |
| 3,937,415 | A | * | 2/1976 | Prinz | 43/27.4 |
| 4,004,366 | A | * | 1/1977 | Berry | 43/27.4 |
| 4,044,489 | A | * | 8/1977 | Henze et al. | 43/27.4 |
| 4,194,459 | A | * | 3/1980 | Lisowski | 114/364 |
| 4,198,775 | A | * | 4/1980 | Leisner | 43/21.2 |
| 4,428,139 | A | * | 1/1984 | Henze et al. | 43/27.4 |
| 4,438,582 | A | * | 3/1984 | Lummis | 43/27.4 |
| 4,852,291 | A | * | 8/1989 | Mengo | 43/21.2 |
| 4,916,847 | A | * | 4/1990 | Rusgo | 43/21.2 |
| 4,932,152 | A | * | 6/1990 | Barlotta et al. | 43/21.2 |

(Continued)

FOREIGN PATENT DOCUMENTS

GB    2394505 A    *    4/2004

(Continued)

*Primary Examiner*—Darren W. Ark
(74) *Attorney, Agent, or Firm*—Frank J. Benasutti (57) ABSTRACT

An apparatus is described, combining a portable outrigger holder with a fishing rod holder; so that both can be moved to a plurality of positions in both a horizontal plane and a vertical plane.

5 Claims, 7 Drawing Sheets

U.S. PATENT DOCUMENTS

| | | | |
|---|---|---|---|
| 4,948,083 A * | 8/1990 | McNaney et al. | 43/21.2 |
| 4,993,346 A * | 2/1991 | Rupp | 43/21.2 |
| 5,054,737 A * | 10/1991 | DeLancey | 43/21.2 |
| 5,142,809 A * | 9/1992 | O'Brien et al. | 43/21.2 |
| 5,367,815 A * | 11/1994 | Liou | 43/21.2 |
| 5,438,789 A * | 8/1995 | Emory | 43/21.2 |
| 5,445,102 A * | 8/1995 | Rupp | 43/27.4 |
| 5,588,630 A * | 12/1996 | Chen-Chao | 248/515 |
| 5,722,630 A * | 3/1998 | Chu et al. | 43/21.2 |
| 5,761,844 A * | 6/1998 | Horschel | 43/21.2 |
| 5,813,162 A * | 9/1998 | Tse et al. | 43/21.2 |
| 5,871,196 A * | 2/1999 | Martelli | 43/21.2 |
| 6,052,937 A * | 4/2000 | Morong | 43/21.2 |
| 6,505,431 B1 * | 1/2003 | Christian et al. | 43/21.2 |
| 6,591,541 B1 * | 7/2003 | Cummings | 43/21.2 |
| 6,637,146 B2 * | 10/2003 | Ernst | 43/21.2 |
| 6,668,745 B2 * | 12/2003 | Slatter | 114/255 |
| 6,769,377 B2 * | 8/2004 | Rupp, II | 43/21.2 |
| 6,898,893 B1 * | 5/2005 | Mukdaprakorn | 43/21.2 |
| 6,907,642 B1 * | 6/2005 | Czipri | 114/364 |
| 6,978,570 B1 * | 12/2005 | Clark et al. | 43/27.4 |
| 7,007,906 B2 * | 3/2006 | Slatter | 43/21.2 |
| 7,114,281 B2 * | 10/2006 | Miller | 43/21.2 |
| 7,197,845 B2 * | 4/2007 | Wilcox et al. | 43/21.2 |
| 2003/0005616 A1 * | 1/2003 | Slatter | 43/27.4 |
| 2005/0056751 A1 * | 3/2005 | Slatter | 248/288.11 |
| 2006/0102822 A1 * | 5/2006 | Liang | 248/514 |
| 2006/0102824 A1 * | 5/2006 | Carnevali | 248/534 |
| 2007/0119089 A1 * | 5/2007 | Nicholson | 43/27.4 |

FOREIGN PATENT DOCUMENTS

| | | |
|---|---|---|
| JP | 8-266206 A * | 10/1996 |
| JP | 9-233984 A * | 9/1997 |
| JP | 11-155452 A * | 6/1999 |
| JP | 2001-8596 A * | 1/2001 |
| NL | 1011666 C6 * | 9/2000 |

* cited by examiner

PRIOR ART

*FIG. 1*

SECTION A-A

COMBINED OUTRIGGER HOLDER AND FISHING ROD HOLDER

CROSS REFERENCE TO RELATED APPLICATIONS

This application claims the benefit of the filing date of our prior application Ser. No. 11/237,605 filed Sep. 27, 2005, entitled "Combined outrigger holder and fishing rod holder"; now abandoned and the benefit of the filing date of our prior application Ser. No. 60/614,633 filed Sep. 29, 2004, entitled "Combined outrigger holder and rod holder" referenced therein, and the applications referenced therein, Ser. No. 10/801,275, filed Mar. 16, 2004, entitled "T-TOP OUTRIGGER HOLDER APPARATUS;" now U.S. Pat. No. 7,197,845 and application Ser. No. 60/455,982, filed Mar. 19,2003, the disclosures of which are incorporated herein by reference as if fully set forth.

BACKGROUND OF THE INVENTION

1. Technical Field

This invention relates to fishing equipment and, more particularly, to fishing rod and outrigger holders for use on boats to hold either the outrigger or the rod or both.

2. Description of the Prior Art

In the prior art of sport fishing equipment, it is known to use outriggers to play out trolling lines away from the sides and back of the boat. These outriggers can be moved in line with the hull and in-board of the boat when they are not being used for trolling. Thus, they are adjustable between the trolling position and the storage position.

These outriggers can be mounted on bases which are either fixed to the gunnels or tops of the boats or are fixed and adjustable, in that the outrigger can be swung out outwardly to a second fixed position. Prior art outriggers are shown in U.S. Pat. Nos. 2,927,754, 3,008,259, 3,161,390, 3,724,791, 5,445,102, and 5,592,893. These patents also show the holders for the outriggers. Many of these patents disclose two means of adjustment: one means of rotating the outrigger and another means of angling the outrigger in a vertical position.

Fishing boats are normally fitted with outrigger and fishing rod holders mounted in the gunnels; as, for example, is shown in the prior art U.S. Pat. No. 5,163,244 (see Prior Art FIG. 1, attached to this application).

A problem with such holders is that they can only be used for one device at a time. Furthermore, they are not adjustable for positioning the outriggers in various inboard, parallel, outboard, and elevated positions.

DESCRIPTION OF THE PREFERRED EMBODIMENTS

Figure 1:
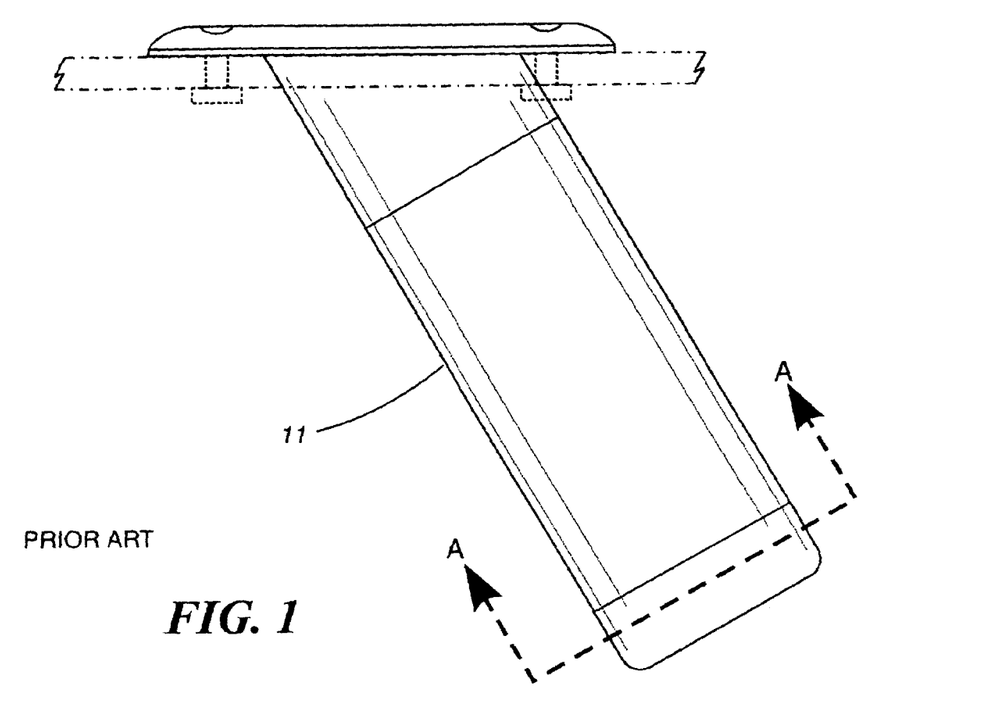
FIG. 1 is a view taken from a prior art patent.
Figure 2:
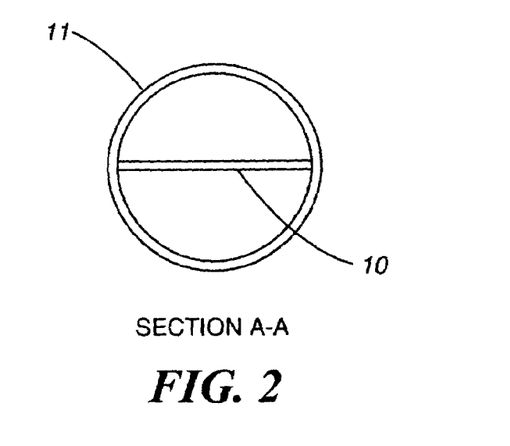
FIG. 2 is a section taken as indicated by the lines and arrows A-A of a portion of a typical apparatus as shown in FIG. 1.

Referring to the Figures, FIG. 1 shows a prior art fishing rod holder 11 for permanent installation in a gunnel of a fishing boat. Taking a section as indicated by the lines and arrows A-A in FIG. 1, the usual holder structure would have a pin 10 across the inside near the bottom. The purpose of the pin 10 is to accommodate the notches in the bottom of a fishing rod. We provide similar notches, designated generally 12 FIG. 3 in the bottom of an outrigger holder 16. Thus the rod or the outrigger holder can be moved, i.e. rotated, to a number of fixed positions; wherein the notches embrace the pin and the structure will not rotate.

Figure 3:
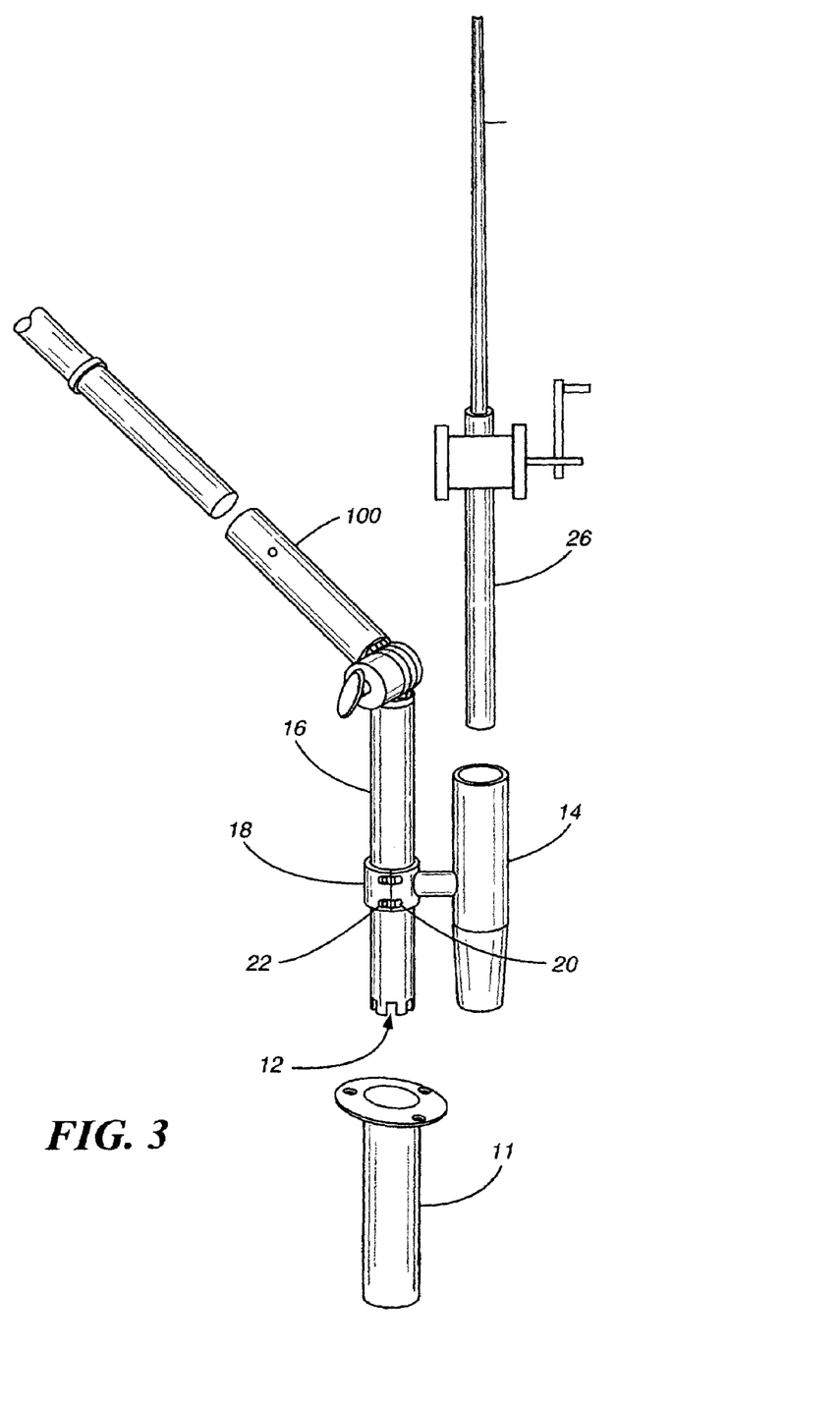
FIG. 3 is an exploded perspective view, partially broken away of a portion of an apparatus in accordance with our invention.

In accordance with our invention, a clamp-on rod holder 14 is provided; which can be clamped on to the outrigger holder 16 by any suitable clamp means 18. The clamp means 18 is most preferably release able as by means of screws 20 fitted into bosses 22. Thus the fishing rod holder 11 can now accommodate our outrigger holder 16 and simultaneously provide a fishing rod holder 14 for the rod 26. It will be understood that the rod holder 14 has a cross-wise internally mounted pin near the bottom to accommodate the notches in the bottom of a fishing rod, as aforesaid.

The clamp-on fishing rod holder 14 may also be used to clamp the holder onto other structural parts of the boat, such as, the tubular structure of a "T" top boat. Thus it provides a means to position rods at other than a fixed number of places on the boat.

The outrigger holder 16 is preferably of a type which provides for adjustment to various angles, i.e. for positioning the outriggers in various inboard, parallel, outboard, and elevated positions. See our prior application Ser. No. 10/801,275 referenced herein above. The arm 100 of the outrigger holder can be adjusted to a plurality of positions in a vertical plane and the holder 16 can be raised from the mount 11 and rotated in a horizontal plane and then lowered into engagement with the pin 10 to fix it in a different horizontal position. Also the rod holder can be mounted on the arm 100 to provide adjustment in a vertical plane.

Figure 4:
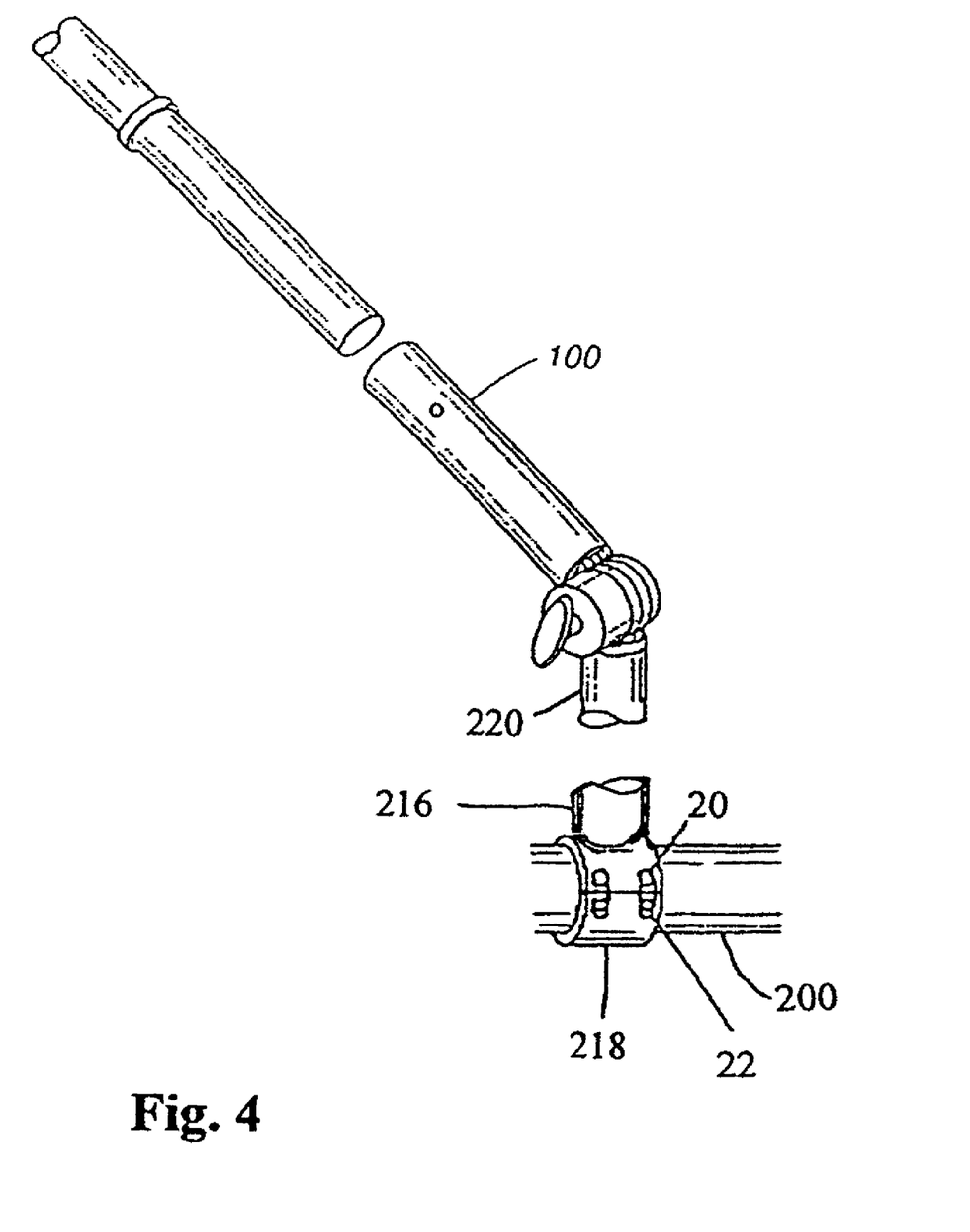
FIG. 4 is an exploded perspective view, partially broken away of a portion of an apparatus in accordance with our invention.
Figures 5, 6, 7:
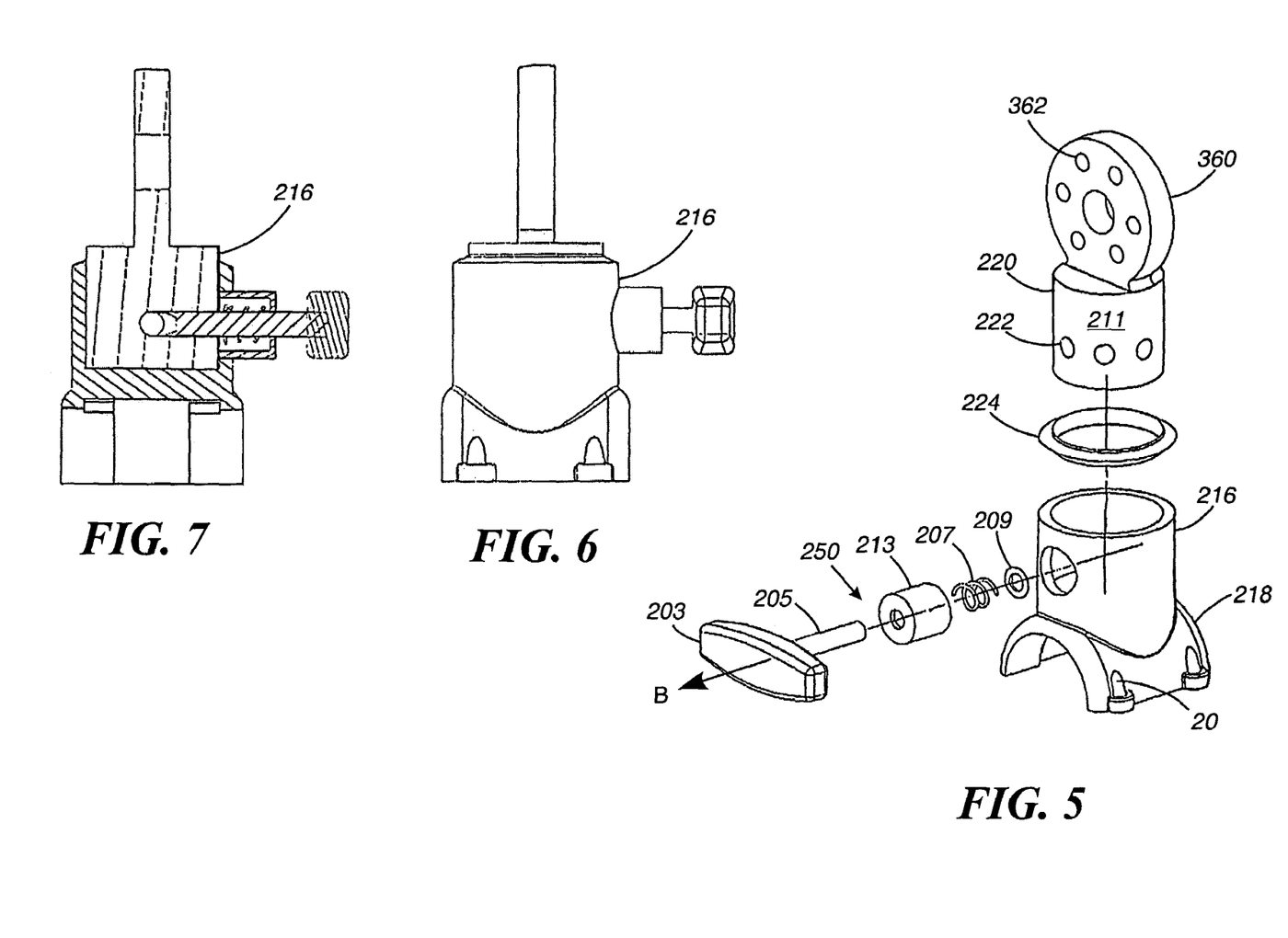
FIG. 5 is an exploded perspective view of a portion of an apparatus in accordance with our invention.
FIG. 6 is a side view of a portion of the apparatus shown in FIG. 5.
FIG. 7 is a vertical, central section of the side view shown in FIG. 6.

In an alternate embodiment shown in FIGS. 4 and 5, we provide a means of mounting the outrigger holder 216 to the tubular structure 200 FIG. 4 of a boat; such as is found on a "T" top construction. Herein the clamp 218 is fixed to or an integral part of a lower portion 216 of the outrigger holder. An upper portion 220 of the outrigger holder is mounted for rotation within the lower portion 216. The upper portion 220 has a plurality of radially extending holes 22 therein spaced circumferentially as shown in FIG. 5. A seal 224 is positioned between the portions 220 and 216 to prevent debris from lodging there between.

A spring loaded handle and plunger means designated generally 250, is provided mounted in the lower portion 216 to engage the holes 222 in the upper portion upon rotation thereof and prevent further rotation thereof. To rotate the upper portion 220 with respect to the lower portion 216, the handle 203 is retracted in the direction of the arrow "B", thereby retracting the pin 205 from one of the holes 222 and allowing the upper portion 216 to be turned in a horizontal plane. Upon release of the handle 203, the spring 207 expands against the spring retainer 209 (which is fixedly attached to the pin 205) and forces the pin against the surface 211 of the upper portion 216. As the upper portion 216 continues to be rotate, the pin 205 eventually engages a hole 222 and prevents further rotation. The housing 213 mounted to the lower portion 216, retains and guides the pin 205. FIG. 6 is a side view of a portion of the assembled portion of the apparatus shown in FIG. 5; and FIG. 7 is a central vertical section of that apparatus.

Figure 8:
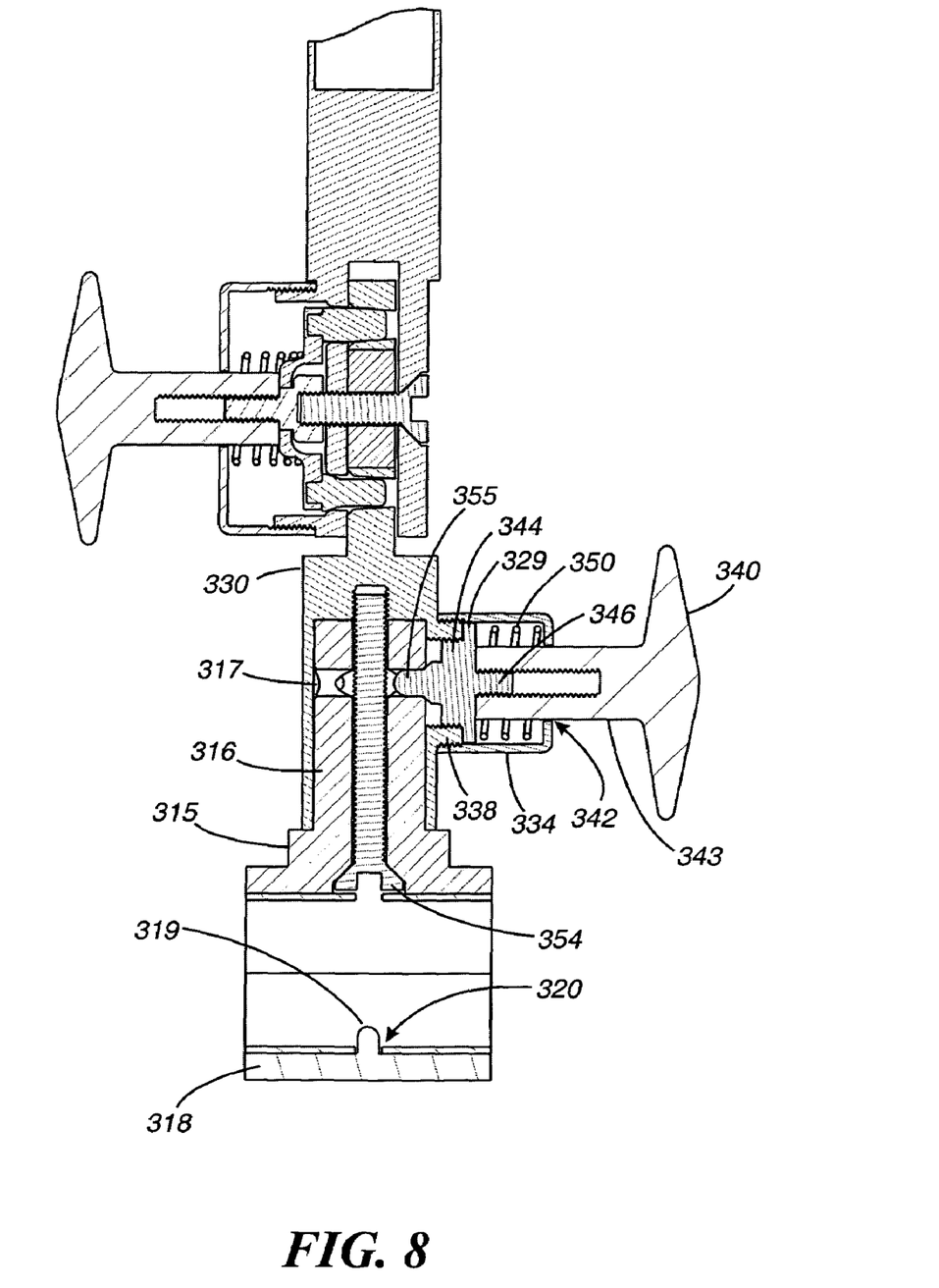
FIG. 8 is a vertical section of a portion of an apparatus in accordance with an alternate embodiment of our invention.
Figure 9:
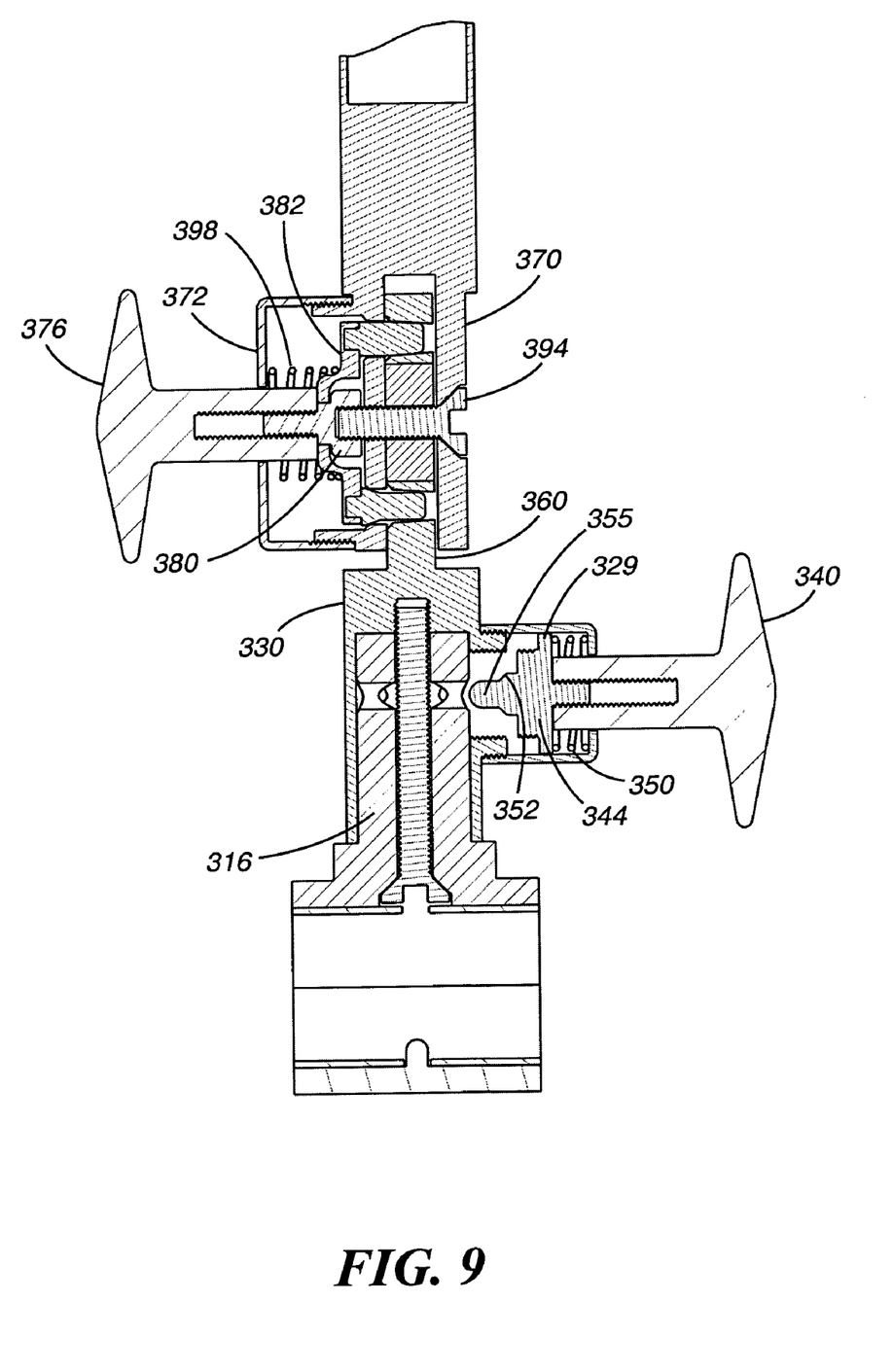
FIG. 9 is a view of the portion of the apparatus shown in FIG. 8; with some of the parts in a different position.
Figure 10:
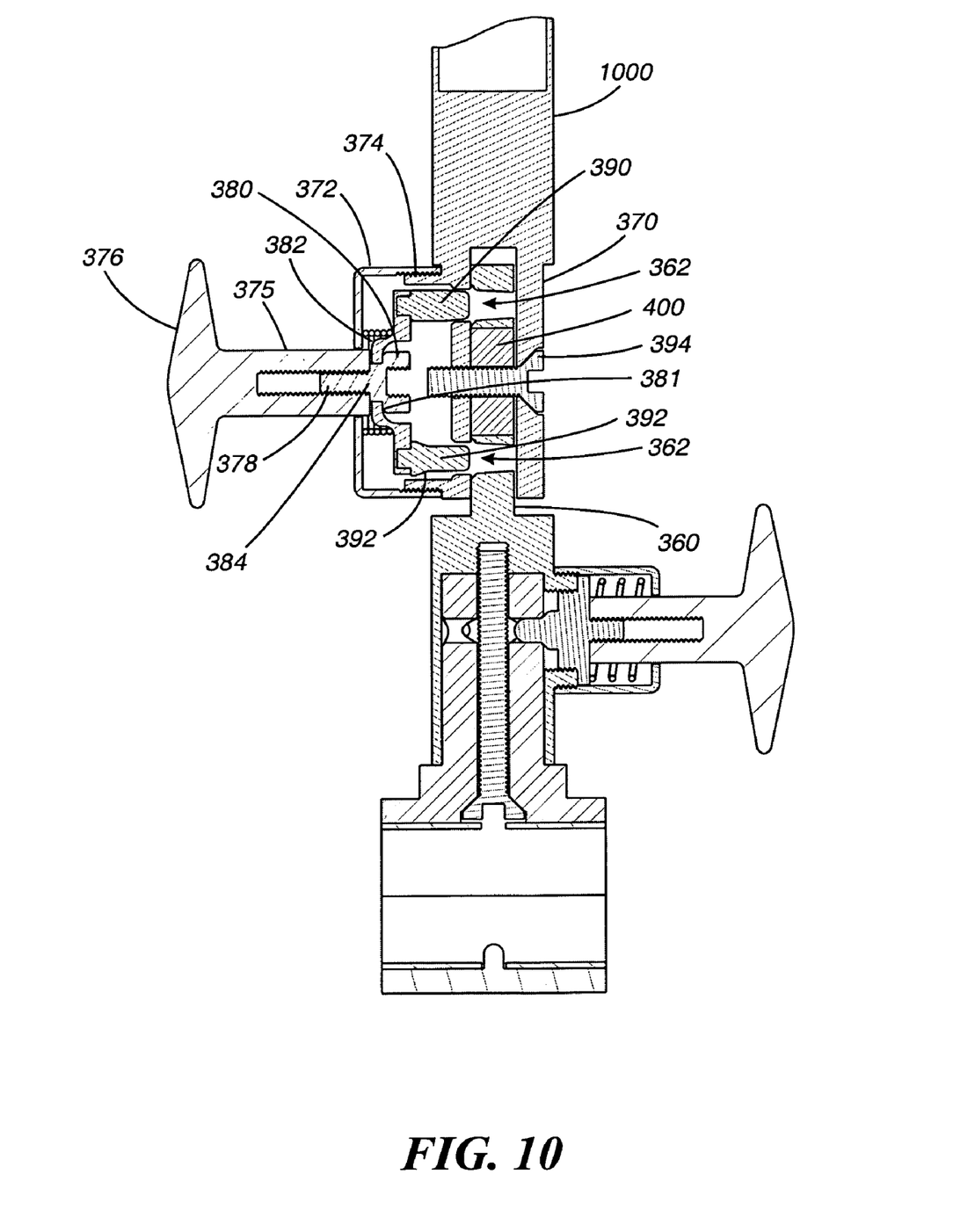
FIG. 10 is a view of the portion of the apparatus shown in FIG. 8; with some of the parts in a different position.

Referring to FIGS. 8 through 10, an alternate embodiment of our invention is shown. These parts are similar in certain respects to those shown in FIGS. 4 through 7.

In this embodiment, the bottom portion 318 of the clamp means is provided with a pin 319 press fitted into a hole in the inner concave surface thereof. The pin provides a means to fix the clamp to the tubular structure 200 FIG. 4 of a boat; such as is found on a "T" top construction. A hole 320 must be drilled into the tube to effect this arrangement.

The upper portion 315 of the clamp is secured to the lower portion by the screws 20 and bosses 22 previously described.

The upper portion 315 has a cylindrical extension 316 which has a plurality of radially extending holes 317 therein in a plane perpendicular to its axis.

Embracing the extension 316 in a sliding fit is a base 330. The base is retained axially with respect to portion 315 by a screw 354 as shown.

The base has a cylindrical boss 338 extending therefrom; which is threaded internally and externally.

Mounted in threaded engagement to the external threads of the boss 338, is a cap 334. The cap has a hole 342 therein, through which the shank 343 of the handle 340 passes.

Inside the cap is a retainer 344 having a cylindrical portion in threaded engagement with the internal threads of the boss 338. The retainer has a shoulder 329 to rest against the end of the boss and prevent it from entering further into the boss. A threaded stud 346 extends from this portion of the retainer and is fixedly threaded into the shank 343. Thus, when the handle 340 is rotated counterclockwise, the retainer 344 will be moved to the right away from the from the extension 316. When the retainer is fully unthreaded from the boss 338, the spring 350, which is retained in the cap 334, will force the retainer 344 toward the boss 338.

Extending from the side of the retainer 344 opposite to the threaded stud 346 is a protrusion 355. This protrusion is dimensioned to fit in sliding engagement within the holes 317. This protrusion is dimensioned to be completely withdrawn from the hole 317 when the retainer is backed off completely from threaded engagement with the boss 338 and the handle 340 is pulled further to the right (when viewed as in FIGS. 8 and 9). In this withdrawn position (FIG. 9), the base 330 can be rotated in a horizontal plane. When the outward force on the handle 340 is released, the spring 350 forces the retainer 344 to the left and thereby forces the protrusion into engagement with the surface of the extension 316. Upon further rotation of the base 330, the protrusion 355 will eventually enter one of the holes 317. The handle 340 can then be rotated clockwise to re-engage the threads of the retainer 344 with the boss 338. As the handle is further rotated in the clockwise direction, the shoulder 352 will eventually engage the edge of the hole 317 and, thereby, provide a snug fit.

Extending upwardly from the base 330, is a donut shaped portion 360 (see also FIG. 5) which has a plurality of radially equidistantly spaced holes 362 there through. Embracing this donut shaped portion, is a forked portion 370 of the end of an arm 1000. See the similar part 100 FIG. 4. The part 1000 is retained axially with respect to the part 330/360 by the bolt 394 and the bushing 400 (through which the bolt passes). The bushing fits in sliding engagement within a hole in the donut shaped portion 360 and is preferably made of a plastic material.

The forked portion 370 has a cylindrical boss 374 extending therefrom; which is threaded externally.

Mounted in threaded engagement to the external threads of the boss 374, is a cap 372. The cap has a hole therein, through which the shank 375 of the handle 376 passes.

Inside the cap 372 is a retainer 380 having a threaded stud 378 extending therefrom which is fixedly threaded into the shank 375. The opposite side of the retainer 380 is in threaded engagement with the bolt 394 (when viewed as in FIGS. 8 and 9). The retainer 380 has a cylindrical portion 384 and an external shoulder 381. Embracing this cylindrical portion in a sliding fit is a retainer plate 382, which rests against the shoulder 381. This plate 382 has pins 390 and 392 fixedly mounted therein which are positioned to engage the holes 362 in the donut shaped portion 360. One of these pins (392) has a tapered portion 393 to engage the edge of the hole 362. A spring 398 is retained within the cap 372 to exert a force against the retainer plate 382.

When the handle 376 is rotated counterclockwise, the retainer 380 will be unthreaded from the bolt 394 and will be moved away from the from the forked portion 370. When the retainer 380 is fully unthreaded from the bolt 394, the spring 398, which is retained in the cap 372, will force the retainer 380 toward the forked portion 370.

The pins which extend from the side of the retainer plate 382 are dimensioned to be completely withdrawn from the holes 362 when the retainer plate is backed off completely from threaded engagement with the bolt 394 and the handle 376 is pulled further to the left (when viewed as in FIGS. 9 and 10). In this withdrawn position, the arm 1000 can be rotated in a vertical plane. When the outward force on the handle 376 is released, the spring 398 forces the retainer plate 382 and the retainer 380 to the right and thereby forces the pins 390 and 392 into engagement with the surface of the donut shaped portion 360. Upon further rotation of the arm 1000, the pins will eventually enter the holes 362. The handle 376 can then be rotated clockwise to re-engage the threads of the retainer 380 with the bolt 394. As the handle is further rotated in the clockwise direction, the shoulder 393 will eventually engage the edge of the hole 362 and, thereby, provide a snug fit.

From what we have described, we have invented a combined outrigger holder and fishing rod holder wherein means are provided for adjusting the outrigger holder to a plurality of positions in both a horizontal plane and a vertical plane and wherein means are provided for adjusting the fishing rod holder to a plurality of positions in both a horizontal plane and a vertical plane.

In particular, we have disclosed a combined outrigger holder and fishing rod holder apparatus for a boat, having means for adjustment of the outrigger holder to a plurality of positions in both a horizontal plane and a vertical plane; an outrigger support means having an arm for holding an outrigger, and further comprising a clamp means for securing the outrigger holder to a portion of said boat; said clamp means having at least two portions forming a clamp; one of said portions being a first portion having a cylindrical extension which has a plurality of radially extending holes therein in a plane perpendicular to its axis; a base embracing the cylindrical extension in a sliding fit; said base being retained axially with respect to said first portion; said base having a cylindrical tubular boss extending therefrom; said boss being threaded internally and externally; a handle having a shank; a cap mounted in threaded engagement to the external threads of the boss; said cap having a hole therein, through which said shank of said handle; a retainer positioned inside said cap; said retainer having a cylindrical portion in threaded engagement with the internal threads of said boss; said retainer having a shoulder arranged to rest against an end of said boss and prevent it from entering further into said boss; a threaded stud extending from said retainer and fixedly threaded into said shank, such that when said handle is rotated counterclockwise, said retainer will be moved away from the from said cylindrical extension; a spring positioned within said retainer, such that when said retainer is fully unthreaded from said boss, said spring will force said retainer 344 toward said boss; a protrusion extending from the side of said retainer opposite to the threaded stud; said protrusion is dimensioned to fit in sliding engagement within the holes in said cylindrical extension; said protrusion being dimensioned to be completely withdrawn from said hole when said retainer is backed off completely from threaded engagement with said boss and said handle is pulled further in the direction of disengagement; whereby, in this withdrawn position, said base can be rotated in a horizontal plane thereby rotating the outrigger support means in a horizontal plane.

Further, when the outward force on the handle is released, the spring forces the retainer in the opposite direction to its disengagement travel and thereby forces the protrusion into engagement with a surface of the extension and upon further rotation of the base, the protrusion eventually enters one of the holes; the handle can then be rotated clockwise to re-engage the threads of the retainer with the boss; and as the handle is further rotated in the clockwise direction, the shoulder will eventually engage the edge of the hole and, thereby, provide a snug fit.

We have also invented, a combined outrigger holder and fishing rod holder apparatus for a boat, having means for adjustment of the outrigger holder to a plurality of positions in both a horizontal plane and a vertical plane; an outrigger support means having an arm for holding an outrigger, and further comprising a clamp means for securing the outrigger holder to a portion of said boat; said clamp means having at least two portions forming a clamp; one of said portions being a first portion forming a base and having a donut shaped portion extending upwardly from the base; which donut shaped portion has a plurality of radially equidistantly spaced holes there through; a forked portion embracing said donut shaped portion; a bushing positioned within said donut shaped portion; a bolt passing through said forked portion and said bushing to retain said forked portion axially with respect to said donut shaped portion, while permitting pivoting of said forked portion with respect to said donut shaped portion in a vertical plane; a cylindrical boss extending from said forked portion; said cylindrical boss being threaded externally; a cap mounted in threaded engagement to the external threads of said boss; a handle having a shank; a cap mounted in threaded engagement to the external threads of the boss; said cap having a hole therein, through which said shank of said handle is positioned; a retainer inside the cap having a threaded stud extending therefrom which is fixedly threaded into the shank; the opposite side of the retainer is in threaded engagement with the bolt; the retainer has a cylindrical portion and an external shoulder; embracing this cylindrical portion in a sliding fit is a retainer plate which rests against the shoulder; said retainer plate has pins fixedly mounted therein which are positioned to engage the holes in the donut shaped portion, at least one of these pins has a tapered portion to engage the edge of a hole; a spring retained within the cap to exert a force against the retainer plate; the parts being configured such that when the handle is rotated counterclockwise, the retainer will be unthreaded from the bolt and will be moved away from the from the forked portion; and when the retainer is fully unthreaded from the bolt, the spring, which is retained in the cap, will force the retainer toward the forked portion; the pins which extend from the side of the retainer plate are dimensioned to be completely withdrawn from the holes when the retainer plate is backed off completely from threaded engagement with the bolt and the handle is pulled further in the back-off direction; whereby, in this withdrawn position, the arm can be rotated in a vertical plane; and when the outward force on the handle is released, the spring forces the retainer plate and the retainer in the opposite direction and thereby forces the pins into engagement with the surface of the donut shaped portion; and upon further rotation of the arm, the pins eventually enter the holes; and then the handle can then be rotated clockwise to re-engage the threads of the retainer with the bolt; and as the handle is further rotated in the clockwise direction, the shoulder eventually engages the edge of the hole and, thereby, provides a snug fit.

The invention claimed is:

1. In a combined outrigger holder and fishing rod holder apparatus for a boat, having means for adjustment of the outrigger holder to a plurality of positions in both a horizontal plane and a vertical plane;

an outrigger support means having an arm for holding an outrigger, and further comprising a clamp means for securing the outrigger holder to a portion of said boat, said clamp means having at least two portions forming a clamp, one of said portions being a first portion having a cylindrical extension which has a plurality of radially extending holes therein in a plane perpendicular to an axis of said cylindrical extension;

a base embracing the cylindrical extension in a sliding fit, said base being retained axially with respect to said first portion;

said base having a cylindrical tubular boss extending therefrom, said boss having internal and external threads;

a handle having a shank;

a cap mounted in threaded engagement to the external threads of the boss, said cap having a hole therein, through which said shank of said handle passes;

a retainer positioned inside said cap, said retainer having a cylindrical portion in threaded engagement with the internal threads of said boss, said retainer having a shoulder arranged to rest against an end of said boss and prevent it from entering further into said boss;

a threaded stud extending from said retainer and fixedly threaded into said shank, such that when said handle is rotated counterclockwise, said retainer will be moved away from said cylindrical extension;

a spring positioned within said cap, such that when said retainer is fully unthreaded from said boss, said spring will force said retainer toward said boss;

a protrusion extending from a side of said retainer opposite to the threaded stud, said protrusion is dimensioned to fit in sliding engagement within the holes in said cylindrical extension, said protrusion being dimensioned to be completely withdrawn from said holes in said cylindrical extension when said retainer is backed off completely from threaded engagement with said boss and said handle is pulled with an outward force further in the direction of disengagement, whereby, in this withdrawn position, said base can be rotated in a horizontal plane thereby rotating the outrigger support means in a horizontal plane.

2. The apparatus of claim 1 wherein, when the outward force on the handle is released, the spring forces the retainer in the opposite direction to its disengagement travel and thereby forces the protrusion into engagement with a surface of the cylindrical extension and upon further rotation of the base, the protrusion eventually enters one of the holes in said cylindrical extension, the handle can then be rotated clockwise to re-engage the threads of the retainer with the boss, and as the handle is further rotated in the clockwise direction, the shoulder will eventually engage an edge of the one of the holes in said cylindrical extension and, thereby, provide a snug fit.

3. The apparatus of claim 1 wherein, a pin is fitted into an other of said two portions of said clamp means which is a second portion for connection to said first portion, said pin providing a means to fix the clamp to a tubular structure of a boat.

4. In a combined outrigger holder and fishing rod holder apparatus for a boat, having means for adjustment of the outrigger holder to a plurality of positions in both a horizontal plane and a vertical plane;

an outrigger support means having an arm for holding an outrigger, and further comprising a clamp means for securing the outrigger holder to a portion of said boat, said clamp means having at least two portions forming a clamp; one of said portions being a first portion forming a base and having a donut shaped portion extending upwardly from the base, said donut shaped portion having a plurality of radially equidistantly spaced holes there through;

a forked portion embracing said donut shaped portion;

a bushing positioned within said donut shaped portion;

a bolt passing through said forked portion and said bushing to retain said forked portion axially with respect to said donut shaped portion, while permitting pivoting of said forked portion with respect to said donut shaped portion in a vertical plane; a cylindrical boss extending from said forked portion; said cylindrical boss having external threads;

a handle having a shank;

a cap mounted in threaded engagement to the external threads of the boss, said cap having a hole therein, through which said shank of said handle is positioned;

a retainer inside the cap having a threaded stud extending therefrom on one side which is fixedly threaded into the shank, an opposite side of the retainer is in threaded engagement with the bolt;

the retainer has a cylindrical portion and an external shoulder, embracing this cylindrical portion in a sliding fit is a retainer plate which rests against the shoulder;

said retainer plate has pins fixedly mounted therein which are positioned to engage the holes in the donut shaped portion, at least one of said pins has a tapered portion to engage an edge of one of said holes in the donut shaped portion;

a spring retained within the cap to exert a force against the retainer plate;

wherein when the handle is rotated counterclockwise, the retainer will be unthreaded from the bolt and will be moved away from the forked portion, and when the retainer is fully unthreaded from the bolt, the spring, which is retained in the cap, will force the retainer toward the forked portion;

the pins which extend from a side of the retainer plate are dimensioned to be completely withdrawn from the holes in the donut shaped portion when the retainer is backed off completely from threaded engagement with the bolt and the handle is pulled with an outward force further in a back-off direction;

whereby, in this withdrawn position, the arm can be rotated in a vertical plane, and when the outward force on the handle is released, the spring forces the retainer plate and the retainer in the opposite direction from the back-off direction and thereby forces the pins into engagement with a surface of the donut shaped portion, and upon further rotation of the arm, the pins eventually enter the holes in the donut shaped portion, and then the handle can then be rotated clockwise to re-engage the threaded engagement of the retainer with the bolt; and as the handle is further rotated in the clockwise direction, the tapered portions of the pins eventually engage edges of the holes in the donut shaped portion and, thereby, provides a snug fit.

5. The combined outrigger holder and fishing rod holder of claim 4 wherein means are provided for adjusting the fishing rod holder to a plurality of positions in both a horizontal plane and a vertical plane.

* * * * *